United States Patent
Haase

(10) Patent No.: US 7,704,375 B2
(45) Date of Patent: Apr. 27, 2010

(54) PROCESS FOR REDUCING CORROSION IN A CONDENSING BOILER BURNING LIQUID FUEL

(75) Inventor: Frank Haase, Hamburg (DE)

(73) Assignee: Shell Oil Company, Houston, TX (US)

( * ) Notice: Subject to any disclaimer, the term of this patent is extended or adjusted under 35 U.S.C. 154(b) by 1443 days.

(21) Appl. No.: 10/521,838

(22) PCT Filed: Jul. 17, 2003

(86) PCT No.: PCT/EP03/07782

§ 371 (c)(1),
(2), (4) Date: Jan. 19, 2005

(87) PCT Pub. No.: WO2004/009741

PCT Pub. Date: Jan. 29, 2004

(65) Prior Publication Data

US 2006/0070913 A1      Apr. 6, 2006

(30) Foreign Application Priority Data

Jul. 19, 2002   (EP) .................................. 02016085

(51) Int. Cl.
*C10L 1/04* (2006.01)
(52) U.S. Cl. ............................. 208/15; 585/14; 431/2; 431/3
(58) Field of Classification Search ............... 208/15; 585/14
See application file for complete search history.

(56) References Cited

U.S. PATENT DOCUMENTS

| 5,378,348 | A | 1/1995 | Davis et al. ................. 208/27 |
| 5,689,031 | A * | 11/1997 | Berlowitz et al. ........... 585/734 |
| 5,766,274 | A | 6/1998 | Wittenbrink et al. .......... 44/436 |
| 5,888,376 | A | 3/1999 | Wittenbrink et al. .......... 208/59 |
| 6,162,956 | A | 12/2000 | Berlowitz et al. |
| 6,204,426 | B1 | 3/2001 | Miller et al. ................ 585/739 |
| 6,296,757 | B1 * | 10/2001 | Wittenbrink et al. .......... 208/15 |
| 6,401,669 | B1 * | 6/2002 | Macgowan et al. ...... 122/448.1 |
| 6,663,767 | B1 * | 12/2003 | Berlowitz et al. ............. 208/15 |
| 6,755,961 | B1 * | 6/2004 | Berlowitz et al. ............. 208/15 |
| 6,776,897 | B2 * | 8/2004 | Bacha et al. ................. 208/14 |
| 6,846,402 | B2 * | 1/2005 | Hemighaus et al. .......... 208/14 |
| 7,189,269 | B2 * | 3/2007 | Clark et al. ................... 44/388 |
| 7,276,094 | B2 * | 10/2007 | Factor et al. ................. 44/358 |

FOREIGN PATENT DOCUMENTS

DE                 32 38 762               1/1984

(Continued)

OTHER PUBLICATIONS

International Search Report dated Nov. 3, 2003.

(Continued)

*Primary Examiner*—Ellen M McAvoy

(57) ABSTRACT

The invention relates to a process for operating a condensing boiler in which the fuel is a Fischer-Tropsch product which boils for more than 90 wt % between 160 and 400° C. and contains more than 80 wt % of iso and normal paraffins, less than 1 wt % aromatics, less than 5 ppm sulfur and less than 1 ppm nitrogen and wherein the density of the Fischer-Tropsch product is between 0.65 g/cm$^3$ and 0.8 g/cm$^3$ at 15° C.

16 Claims, 1 Drawing Sheet

FOREIGN PATENT DOCUMENTS

| | | |
|---|---|---|
| DE | 34 34 415 | 3/1986 |
| DE | 44 30 889 | 7/1995 |
| EP | 583836 | 2/1994 |
| EP | 0699872 | 3/1996 |
| EP | 0789203 | 8/1997 |
| EP | 1101813 | 5/2001 |
| WO | 97/14768 | 4/1997 |
| WO | 97/14769 | 4/1997 |
| WO | 00/20534 | 4/2000 |
| WO | 00/20535 | 4/2000 |
| WO | 01/11116 | 2/2001 |
| WO | 01/11117 | 2/2001 |
| WO | 01/83406 | 11/2001 |
| WO | 01/83641 | 11/2001 |
| WO | 01/83647 | 11/2001 |
| WO | 01/83648 | 11/2001 |

OTHER PUBLICATIONS

Heizung and Klimatechnik Jan. 2002 German Version by Recknagel, Sprenger, Schramek, ISBN:3-468-26450-8, pp. 718-719.

English Translation of Japanese non-patent literature document from Collected Preliminary Manuscripts of Catalyst Symposium Lectures, Japan, The Petroleum Society, "Shell Group GTL Fuel Development and Application Performance," Oct. 3, 2001, pp. 8-14.

* cited by examiner

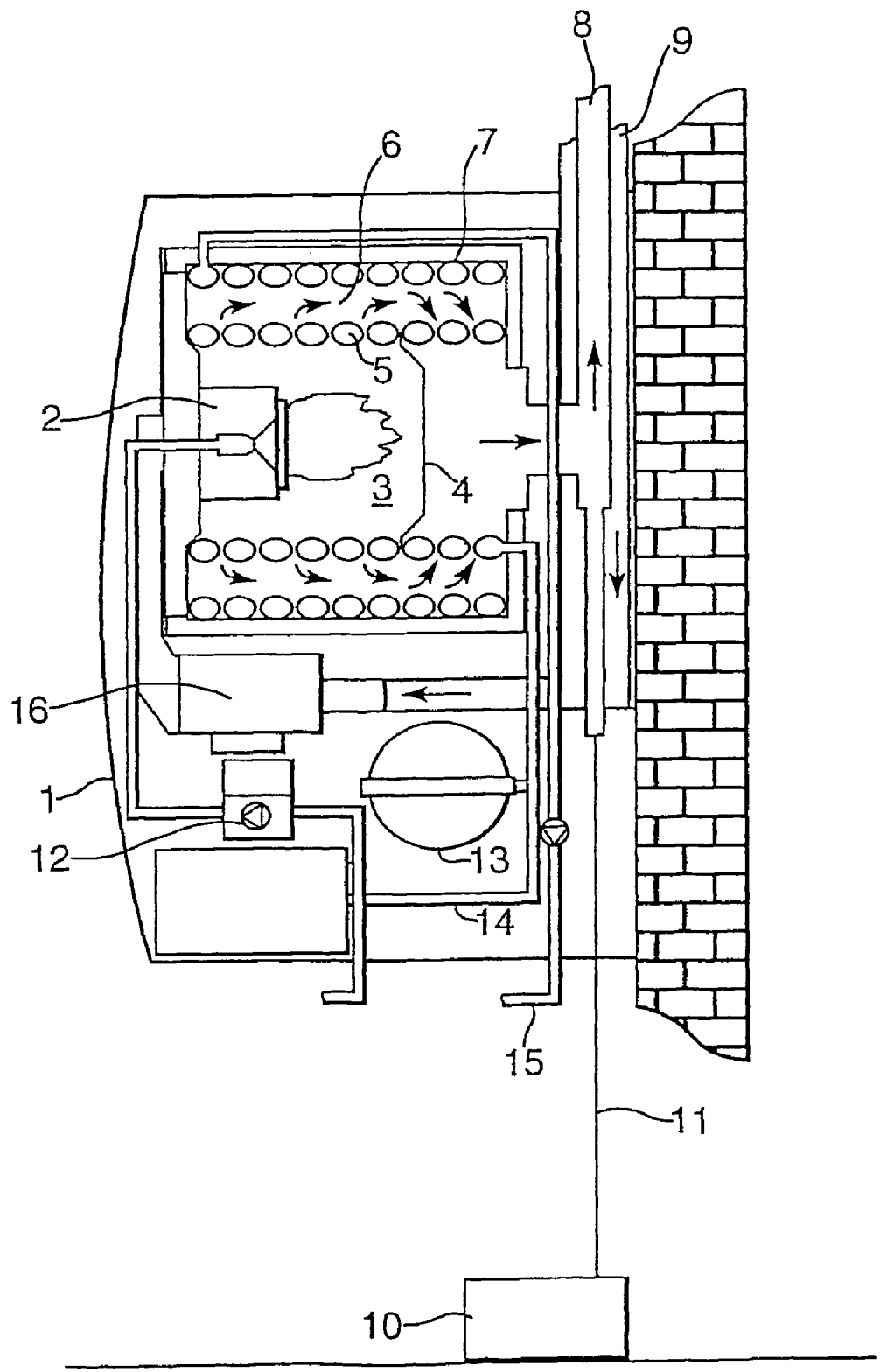

PROCESS FOR REDUCING CORROSION IN A CONDENSING BOILER BURNING LIQUID FUEL

PRIORITY CLAIM

The present application claims priority on European Patent Application 02016085.9 filed 19 Jul. 2002.

FIELD OF THE INVENTION

The invention relates to a process for operating a condensing boiler. This invention relates to boilers and, in particular, to condensing boilers typically used for heating water for commercial or domestic applications such as space heating and domestic water heating.

BACKGROUND OF THE INVENTION

Condensing boilers are described in EP-A-0789203. This publication describes a gas fired condensing boiler. These boilers are called condensing boilers because the gases produced by combustion are cooled inside the apparatus until the water vapor contained therein condenses, so as to recover the latent condensation heat and transfer it to the water to be heated, which flows through said boilers. This latent heat is sometimes also used to pre-heat the combustion air. A problem associated with these condensing boilers is that the liquid condensate by-products of the combustion must be contained and channeled away for disposal. Furthermore, heat exchanger materials must be capable of withstanding the corrosive liquid condensate by-products. Steps should also be taken to ensure that the burner and igniter systems, along with other system elements such as sensors, are not fouled by moisture or condensation.

Normally, condensing boilers use natural gas as fuel. For example in The Netherlands, which is equipped with a wide spread natural gas grid, many households use a condensing boiler for domestic heating in combination with warm water supply. The wide application of these condensing boilers is due to the attractive energy efficiency of these apparatuses and the presence of the natural gas supply grid.

A disadvantage of these apparatuses is that they cannot be easily applied in regions where no natural gas grid is present. A solution to this problem is to use a liquid fuel. Liquid fuels can be easily transported to and stored by the end user. A disadvantage of the use of liquid fuels is however that the condensing boiler and/or the associated chimneys have to be made from different, more corrosion resistant, materials. For example EP-A-699872 describes a condensing boiler wherein use is made of carbon materials to avoid corrosion. DE-A-3434415 describes another heating device wherein flue gasses are cooled against combustion air in a heat exchanger made of corrosive resistant material. DE-A-3238762 is another example of a heating device wherein a corrosive resistant material is used for this purpose. These solutions are a disadvantage for the manufacturer of condensing boilers because it would result in two types of boiler apparatuses, namely one operating on gas and one operating on liquid fuel. Moreover the apparatus using a liquid fuel would be more expensive due to the different more corrosive-resistant material required.

It would be useful to provide a process for operating a condensing boiler for regions not equipped with a natural gas supply grid.

SUMMARY OF THE INVENTION

The invention is directed to a process for operating a condensing boiler comprising a flame burner, the process comprising burning a Fischer-Tropsch derived fuel.

BRIEF DESCRIPTION OF THE DRAWINGS

The FIGURE shows a schematic representation of such a condensing boiler.

DETAILED DESCRIPTION OF THE INVENTION

Applicants have found that the corrosive nature of the condensate liquid by-product as produced when a Fischer-Tropsch derived fuel is used is low. The corrosive nature of the condensate liquid by-product is lower when compared to the condensate liquid by-product as obtained when an (low-sulphur) industrial gas oil (IGO) is used as fuel. The corrosive nature is such that a condensing boiler suitable for gas firing can also be used for liquid fuel firing. Some small adjustments to the burner may be necessary. This is however much less cumbersome as to apply different materials for, for example, the heat exchanging surfaces of the condensing boiler and/or the chimney.

Furthermore less lower $NO_X$ emissions have been found when emissions of a Fischer-Tropsch derived fuel are compared to those of an Industrial Gas Oil. A next advantage is that less odor, lower hydrocarbon emissions and lower carbon monoxide emissions during start and extinction of the burner have been observed when using this fuel. This is very advantageous because the burner of a condensing boiler will very often start and stop.

A next advantage is that Fischer-Tropsch derived fuels are very stable and can be stored for a prolonged period of time. This is advantageous when such a fuel is stored for domestic use. In spite of its stability the Fischer-Tropsch derived fuel is also biodegradable making it a very environmental friendly fuel.

The FIGURE shows a schematic representation of such a condensing boiler.

The FIG. 1 shows a wall-mounted condensing boiler housing 1 comprising a centrally positioned burner 2. The burner flame exists in a combustion space 3, which is confined by an end wall 4 and a heat exchanger tube wall 5. Flue gasses can leave the combustion space 3 through openings in the wall 5 to enter an annular space 6, which is confined by further heat exchanger tube wall segments 7. The housing 1 further is provided with means 14 to supply cold water to the heat exchanger tube wall 4,5 and means 15 to discharge heated water from said tube wall 4,5. The housing 1 is further provided with a chimney 8 for discharging flue gas fluidly connected to space 6. The air provided to burner 2 via van 16 is pre-heated against flue gas leaving the housing by passing the air counter currently along the chimney 8 in an annular space 9. In the chimney 9 water condenses and the condensate is discharged to a drain 10 via conduit 11. An oil pump 12 to supply the Fischer-Tropsch fuel and an expansion vessel 13 is also shown in FIGURE.

The burner used in the condensing boiler may be a yellow flame burner or preferably a blue flame burner. Yellow and blue flame burners are well known types of burners and are for example described in the general textbook, "Heizung+Klimatechnik 01/02" German Version by Recknagel, Sprenger, Schramek, ISBN: 3-468-26450-8, on pages 718-719.

Yellow flame burners are often provided with a flame detector. Most detectors, which are used today, detect a particular wavelength associated with the yellow color of the flame. Applicants have now found that when a Fischer-Tropsch derived fuel is used the commonly known detectors fail to observe the resulting blue colored flame. For this reason the yellow flame burner is preferably provided with a detector which can detect this blue flame. Examples of suitable detectors are the detectors that are used in blue flame burners, especially UV sensors and JR sensors. A more preferred detector is the so-called ionization sensor. An ionization sensor is suitable to monitor burners with intermittent operation as well as continuous operation. The principle of operation of the ionization flame monitor is based on the rectifying effect of a flame. If a flame is present, a current flows between the burner an the ionization electrode. This ionization current is evaluated by the flame monitor to determine if a flame is present. In some prior art applications ionization sensors could not be used in combination with a liquid fuel because deposits in the sensor led to false currents in the sensor. Because burning the Fischer-Tropsch derived fuel results in fewer deposits ionization sensors can be applied. This is an advantage because these sensors are more readily available than the JR or UV sensors. Alternatively, additives may be added to the Fischer-Tropsch derived fuel which result in a flame which can be detected by the above standard yellow flame burner detector.

The operating conditions of the yellow or blue flame burner may be the same as the operating conditions used for the state of the art liquid fuels. The proportion of air in excess of that required for stoichiometric combustion is known as the excess air ratio or "lambda", which is defined as the ratio of total air available for combustion to that required to burn all of the fuel. Preferably the lambda is between 1 and 2 and more preferably between 1 and 1.6. Applicants found that by using a Fischer-Tropsch derived fuel a very low lambda of between 1.05 and 1.2 could be applied without large emissions of carbon monoxide, as would be the case when Industrial Gas Oil would be used.

The Fischer-Tropsch derived fuel will comprise a Fischer-Tropsch product which may be any fraction of the middle distillate fuel range, which can be isolated from the (hydrocracked) Fischer-Tropsch synthesis product. Typical fractions will boil in the naphtha, kerosene or gas oil range. Preferably a Fischer-Tropsch product boiling in the kerosene or gas oil range is used because these fractions are easier to handle in for examples domestic environments. Such products will suitably comprise a fraction larger than 90 wt % which boils between 160 and 400° C., preferably to about 370° C. Examples of Fischer-Tropsch derived kerosene and gas oils are described in EP-A-583836, WO-A-9714768, WO-A-9714769, WO-A-011116, WO-A-011117, WO-A-0183406, WO-A-0183648, WO-A-0183647, WO-A-0183641, WO-A-0020535, WO-A-0020534, EP-A 1101813, U.S. Pat. No. 5,766,274, U.S. Pat. No. 5,378,348, U.S. Pat. No. 5,888,376 and U.S. Pat. No. 6,204,426.

The Fischer-Tropsch derived product will suitably contain more than 80 wt % and more suitably more than 95 wt % iso and normal paraffins and less than 1 wt % aromatics, the balance being naphthenics compounds. The content of sulfur and nitrogen will be very low and normally below the detection limits for such compounds. This low content of these elements is due to the specific process wherein the Fischer-Tropsch reaction is performed. The content of sulfur will therefore be below 5 ppm and the content of nitrogen will be below 1 ppm. As a result of the low contents of aromatics and naphthenics compounds the density of the Fischer-Tropsch product will be lower than the conventional mineral derived fuels. The density will be between 0.65 and 0.8 g/cm$^3$ at 15° C.

The fuel used in the process of the present invention may also comprise fuel fractions other than the Fischer-Tropsch product. Examples of such fractions may be the kerosene or gas oil fractions as obtained in traditional refinery processes, which upgrade crude petroleum feedstock to useful products. Preferred non-Fischer-Tropsch fuel fractions are the ultra low sulfur (e.g. less than 50 ppm sulfur) kerosene or diesel fractions, which are currently on the market. Optionally non-mineral oil based fuels, such as bio-fuels, may also be present in the fuel composition. The content of the Fischer-Tropsch product component in the fuel will preferably be above 40 wt %, more preferably above 60 wt % and most preferably above 80 wt %. It should be understood that the content of such, currently less available, Fischer-Tropsch product will be optimized, wherein pricing of the total fuel will be balanced with the advantages of the present invention. For some applications fuels fully based on a Fischer-Tropsch product plus optionally some additives may be advantageously used.

The fuel may also comprise one or more of the following additives: detergents, for example OMA 350 as obtained from Octel OY; stabilizers, for example Keropon ES 3500 as obtained from BASF Aktiengesellschafl, FOA 528 A as obtained from OCTEL QY; metal-deactivators, for example IRGAMET 30 (as obtained from Specialty Chemicals Inc; (ashless) dispersants, for example as included in the FOA 528 A package as obtained from Octel QY; anti-oxidants: IRGANOX L06, or LRGANOX L57 as obtained from Specialty Chemicals Inc; cold flow improvers, for example Keroflux 3283 as obtained from BASF Aktiengesellschafl, R433 or R474 as obtained from Infineum UK Ltd; combustion improver, for example ferrocene, methylcyclopentadienyl-manganese-tricarbonyl (MMT); anti-corrosion: Additin RC 4801 as obtained from Rhein Chenije GmbH, Kerocorr 3232 as obtained from BASF, SARKOSYL 0 as obtained from Ciba; re-odorants, for example Compensol as obtained from Haarmann & Reimer; biociodes, for example GROTA MAR 71 as obtained from Schuelke & Mayr; lubricity enhancers, for example OLI 9000 as obtained from Octel; dehazers, for example T-9318 from Petrolite; antistatic agents, for example Stadis 450 from Octel; and foam reducers, for example TEGO 2079 from Goldschmidt.

The total content of the additives may be suitably between 0 and 1 wt % and preferably below 0.5 wt %.

The invention will now be illustrated with the following non-limiting examples.

Example 1

To a blue flame burner type BNR 10 (Intercal Wearmetechnik GmbH) as placed in a Therma Nova 2025 condensing boiler (Therma Tec GmbH) a Fischer-Tropsch gas oil (Oil A), an ultra low sulfur gas oil (Oil B) and a standard industrial gas oil (Oil C) having the properties as listed in Table 1 was fed at a constant power level. The oils contained the same standard additive package. The condensing boiler type was operated such that condensation of water as present in the flue gas took place on both the heat exchanging surfaces of the boiler as well as in the chimney.

TABLE 1

| | Fischer-Tropsch gas oil (A) | Reference oil-1 (B) | Reference oil-2 (C) |
|---|---|---|---|
| Density (at 15° C. in kg/m$^3$ | 785.2 | 854.3 | 846.3 |
| Sulfur content (wt %) | <0.0001 | 0.142 | 0.061 |
| Kinematic viscosity at 20° C. (mm$^2$/s) | 6.444 | 3.842 | 4.621 |
| Flash point (° C.) | 92 | 64 | 66 |

The condensate liquid was collected with a drain and the iron and nickel content was measured. The results are presented in Table 2. The higher the iron and nickel content the higher the rate of corrosion in the condensing boiler. The results in Table 2 clearly show that when a Fischer-Tropsch fuel is used considerably less corrosion occurs.

TABLE 2

| | Iron content in condensate (mg/kg) | Nickel content in condensate (mg/kg) |
|---|---|---|
| Fischer-Tropsch fuel | 0.06 | 0.01 |
| IGO (*) | 1.85 | 0.06 |
| IGO low sufur | 1.03 | 0.06 |

(*) - Industrial Gas Oil

I claim:

1. A process for reducing corrosion in a condensing boiler burning liquid fuel, the process comprising:
    supplying liquid fuel comprising Fischer-Tropsch derived fuel to the condensing boiler,
    combusting the liquid fuel under conditions effective to produce heated combustion gas;
    subjecting a heat exchange fluid to tire heated combustion gas under conditions effective to heat the heat exchange fluid and to cool the heated combustion gas, thereby producing a liquid condensate; and,
    channeling the liquid condensate away from the condensing boiler, the channeling equipment exhibiting reduced corrosion compared to corrosion experienced burning a standard industrial gas oil fuel using the same condensing boiler under the same conditions.

2. The process of claim 1 further comprising using the condensing boiler to heat water or space.

3. The process of claim 2 wherein the liquid condensate comprises a reduced iron content compared to the iron content produced by combusting an industrial gas oil fuel using the same condensing boiler under the same conditions.

4. The process of claim 2 wherein the liquid condensate comprises a reduced nickel content compared to the nickel content produced by combusting an industrial gas oil fuel using the same condensing boiler under the same conditions.

5. The process of claim 3 wherein the liquid condensate comprises a reduced nickel content compared to the nickel content produced by combusting an industrial gas oil fuel using the same condensing boiler under the same conditions.

6. The process claim 1 further comprising supplying the Fischer-Tropsch derived fuel boiling for more than 90 wt % between 160° C. and 400° C.

7. The process claim 1 further comprising supplying the Fischer-Tropsch derived fuel boiling for more than 90 wt % between 160° C. and 370° C.

8. The process of claim 1 further comprising supplying the Fischer-Tropsch derived fuel comprising a Fischer-Tropsch product which contains more than 80 wt % of iso and normal paraffins, less than 1 wt % aromatics, less than 5 ppm sulfur and less than 1 ppm nitrogen and wherein the density of the Fischer-Tropsch product is between 0.65 and 0.8 g/cm$^3$ at 15° C.

9. The process of claim 1 further comprising supplying the Fischer-Tropsch derived fuel comprising more than 80 wt % of a Fischer-Tropsch product.

10. The process claim 1 further comprising providing the Fischer-Tropsch derived fuel comprising a fraction selected from the group consisting of a mineral oil fraction, a non-mineral oil fraction, and a combination thereof.

11. The process of claim 1 further comprising providing the condensing boiler with a burner selected from the group consisting of a yellow flame burner, a blue flame burner, or a combination thereof.

12. The process claim 11 further comprising operating the burner at a lambda of between 1 and 1.6.

13. The process of claim 9 further comprising operating the burner at a lambda of between 1.05 and 1.2.

14. The process of claim 11 further comprising starting the burner more than three times per hour, the condensing boiler producing lower carbon dioxide emissions compared to combusting an Industrial Gas Oil using the same condensing boiler under the same conditions.

15. The process of claim 1 wherein the combustion produces lower hydrocarbon emissions compared to combusting an Industrial Gas Oil using the same condensing boiler under the same conditions.

16. The process of claim 1 wherein the combustion produces lower $NO_x$ emissions compared to combusting an Industrial Gas Oil using the same condensing boiler under the same conditions.

* * * * *